United States Patent [19]

Bertling et al.

[11] 4,416,347
[45] Nov. 22, 1983

[54] APPARATUS FOR PROPULSION CONTROL IN A MOTOR VEHICLE HAVING AN ANTI-LOCKING SYSTEM

[75] Inventors: Hannes Bertling, Vaihingen; Heinz Leiber, Leiman, both of Fed. Rep. of Germany

[73] Assignee: Robert Bosch GmbH, Stuttgart, Fed. Rep. of Germany

[21] Appl. No.: 268,619

[22] Filed: Jun. 1, 1981

[30] Foreign Application Priority Data

Jun. 4, 1980 [DE] Fed. Rep. of Germany ....... 3021116

[51] Int. Cl.³ .............................................. B60T 8/02
[52] U.S. Cl. .............................. 180/197; 192/0.082; 303/110
[58] Field of Search ............... 180/197; 303/110, 113; 192/0.08, 0.082

[56] References Cited

U.S. PATENT DOCUMENTS 3,844,371 10/1974 Garcea ............................... 180/197
4,206,950 6/1980 Elliot .................................. 303/110
4,310,201 1/1982 Pauwels ............................ 180/197

Primary Examiner—John A. Pekar
Assistant Examiner—D. Lynn Fugate
Attorney, Agent, or Firm—Edwin E. Greigg

[57] ABSTRACT

An apparatus for propulsion control in a motor vehicle with an anti-locking system is proposed, in which the supply and outflow of pressure medium is controllable via electromagnetically actuatable valves and which is characterized in that means are provided with which the return flow line can be exposed to pressure. It is the purpose of the apparatus to expand an anti-locking system to include a drive slippage regulating function, and this expansion is problem-free and cost-favorable. The proposed apparatus furthermore assures that a brake pedal actuation has priority. It is also proposed in the case of excessive slippage of both driven wheels to reduce the engine output. This is attained with a controllable drag member disposed between the driving pedal (or linkage) and the throttle valve, the control of the drag member being effected by means of the auxiliary pressure in the return flow line and via an electromagnetically controllable three-port, two-position valve for a hydraulic AND member.

14 Claims, 6 Drawing Figures

FIG. 2

| BRAKE PRESSURE | SLIPPAGE | HYDRAULIC VALVE 21 | PRESSURE ON RETURN FLOW LINE 24 | INLET/OUTLET VALVE 13 | RIGHT VALVE 14 | LEFT VALVE 15 | |
|---|---|---|---|---|---|---|---|
| no | no | 0 | 1 | 0 | 0 | 0 | a) |
| no | right rear | 0 | 1 | 1(0) | 0(1) | 1 | b) |
| no | left rear | 0 | 1 | 1(0) | 1 | 0(1) | c) |
| no | right + left rear | 0 | 1 | 1(0) | 0(1) | 0(1) | d) |
| yes | no | 1 | 0 | X | X | X | e) |

Valve Positions

0 ≙ unexcited or unactuated

1 ≙ excited or actuated

X = dependent on anti-skid function or 0

FIG. 4

| BRAKE PRESSURE | Slippage | Hydraulic Valve Nr. 21 | System pressure on return flow lines Nr. 24a+b | Inlet/Outlet Valve Nr. 13a | Inlet/Outlet Valve Nr. 13b | Maintenance Valve Nr. 14a | Maintenance Valve Nr. 15a | Maintenance Valve Nr. 14b | Maintenance Valve Nr. 15b |
|---|---|---|---|---|---|---|---|---|---|
| none | none | 0 | 1 | 0 | 0 | 0 | 0 | 0 | 0 |
| | right rear | 0 | 1 | 1 | 0 | 1 | 0(1) | 0 | 0 |
| | left rear | 0 | 1 | 0 | 1 | 0 | 0 | 1 | 0(1) |
| | right left rear | 0 | 1 | 1 | 1 | 1 | 0(1) | 1 | 0(1) |
| yes | none | 1 | 0 | X | X | X | X | X | X |

Valve Positions  0 ≙ unexcited or unactuated
1 ≙ excited or actuated
X = dependent on anti skid function 1 or 0

APPARATUS FOR PROPULSION CONTROL IN A MOTOR VEHICLE HAVING AN ANTI-LOCKING SYSTEM

BRIEF SUMMARY OF THE INVENTION

The invention is based on an apparatus for propulsion control in a motor vehicle having an anti-locking system in which a supply of pressure medium and outflow of pressure medium to wheel brake cylinders is controllable by electromagnetically actuable valves and valves are provided with which return flow lines are exposed to pressure.

BACKGROUND OF THE INVENTION

Apparatus of this kind is already known which has a normally open inlet valve located in the pressure medium line between the main cylinder and the wheel brake cylinder, and a normally closed outlet valve located between the wheel brake cylinder and a pressure medium container. While these two valves represent the primary components of the anti-locking system, the wheel brake cylinder can be additionally exposed to pressure medium via a normally closed valve for purposes of propulsion control.

With a view to desired mass production of combination anti-locking systems and propulsion control systems, the known apparatus proves to be too complicated and thus too expensive. Furthermore, the valve for propulsion control and the inlet valve of the brake system are disposed in parallel in the known system, so that safety problems can occur under some circumstances.

OBJECT AND SUMMARY OF THE INVENTION

The apparatus according to the invention in which a supply of pressure medium and outflow of pressure medium to wheel brake cylinders is controlable by electromagnetically actuable valves and valves are provided with which return flow lines are exposed to pressure has the advantage over the prior art that a separate electromagnetic valve is not required and that furthermore the priority of the braking signal is assured.

As a result of the characteristics disclosed in the dependent claims, advantageous modifications of and improvements to the apparatus disclosed in the main claim are possible. They relate especially to apparatuses of this kind in anti-locking systems located in series. It has been proved to be particularly advantageous for a three-port, two position valve actuatable by the pressure in the main cylinder line to be disposed in the return flow line. The return flow line can be exposed to pressure or relieved of pressure by way of this three-port, two position valve.

The system can also be extended relatively simply so that the throttle valve can be influenced in accordance with slippage.

The invention will be better understood and further objects and advantages thereof will become more apparent from the ensuing detailed description of preferred embodiments taken in conjunction with the drawings.

BRIEF DESCRIPTION OF THE DRAWINGS

FIG. 2 is a so-called truth table showing the relationship between the individual driving states as they occur and the actuation of the individual valves;

FIG. 4 is the truth table pertaining to the apparatus of FIG. 3; and

DESCRIPTION OF THE PREFERRED EMBODIMENTS

Figure 1:
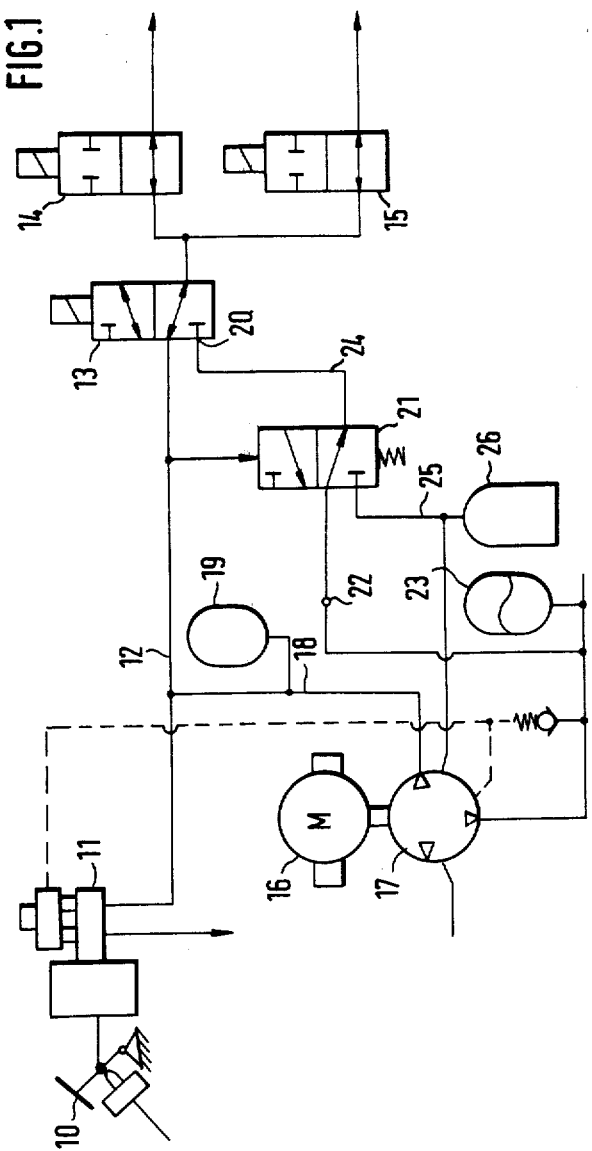
FIG. 1 shows a first example of the apparatus for propulsion control in a motor vehicle having an anti-locking system, in which the return flow line is exposed to pressure by means of a separately generated auxiliary pressure.

FIG. 1 is a schematic overview of the important elements and lines of a single brake circuit in combination with an anti-wheel lock or anti-skid system which is herein termed an anti-locking system in a motor vehicle. The apparatus includes a brake pedal 10, a main brake cylinder 11, a main cylinder line 12 and electromagnetically triggerable valves 13 through 15. Valve 13 is a three-port, two position valve, while the two other valves, 14 and 15, are normally open two-port, two position valves which control the supply of pressure medium to the wheel brake cylinders, not shown in detail, of the right and left wheels.

A motor 16 is combined with a multiple-pump assembly 17. During the anti-locking function, this pump assembly 17 delivers the braking medium withdrawn from the wheel cylinders via the valve 13 back into the main cylinder line. A supplementary volume for damping pressure fluctuations is indicated by reference numeral 19.

The return flow line connection 20, which is not switched open in the resting state of the valve 13, communicates with an auxiliary pressure line 22 via a hydraulically actuatable three-port, two position valve 21. This auxiliary pressure line 22 is likewise coupled with the multiple-pump assembly 17 and also with a reservoir 23. The valve 21 is actuated by the pressure in the main cylinder line 12. If this valve 21 is actuated, then return flow line 24 of the two valves 13 and 21 is coupled with an outflow line 25, and as a result the return flow line is exposed only to the pressure in the line 25. The outflow line 25 leads to a return flow reservoir 26 and back to the multiple-pump assembly 17.

The mode of operation of the apparatus shown in FIG. 1 will now be explained with the aid of FIG. 2. The table given in FIG. 2 shows the resting or working position of the individual valves and the appearance of the pressure in the main cylinder line 12, this information being given in the horizontal lines of the table. Various operational states are listed in the vertical columns of the table.

If the brake pedal 10 is not pressed down (line a), then the valve 21 is in the position of rest, and the return flow line 24 is exposed to pressure. In this driving state, it is not possible to regulate the braking. If increased slippage does not appear at any of the driven wheels, the valve 13 is also in the resting state, as are the two valves 14 and 15 associated with the respective wheel brake cylinders.

The next three cases (lines b, c and d) pertain to propulsion control means. It is possible both for one each of the two driven wheels and for both wheels in common to attain an excessively high slippage value, so that braking of the spinning wheels is desired. In line b the values are given for the case where there is no braking pressure but there is increased slippage at the right-hand wheel. In that case, the valve 21 is in its resting position, while the return flow line 24 is exposed to pressure. In order to brake the spinning wheel, the valve 13 is excited, as is the valve 15 associated with the left-hand wheel, so that braking pressure is not established there as well. Following a sufficient braking procedure for the spinning wheel, the valve 14 is excited in order to keep the braking pressure at a constant level; alternatively, however, both valves 13 and 14 are switched back into the resting position for the purpose of building up pressure.

In the case of an asymmetric propulsion control for the left-hand wheel, the same conditions prevail as noted above, with the distinctions that the triggering of the valves 14 and 15 is effected in the reverse direction. In this case, the valve 14 for the right wheel is excited and remains excited, and the provision of the valves 15 and 13 is respectively controlled in accordance with the amount of slippage.

If the driving slippage exceeds a certain value (line d) for both wheels, then the auxiliary pressure is switched from line 22 via the valves 21 and 13 and via the two valves 14 and 15 to both wheel brake cylinders. A separate control of these valves 13, 14 and 15 is then effected in accordance with the extent of the respective slippage.

In the case of a braking procedure, the pressure in the main cylinder line 12 increases, and the hydraulically actuatable valve 21 switches over. The return flow line 24 becomes free of pressure as a result. The individual valves 13, 14 and 15 control the brake pressure in the respective brake cylinders in accordance with the braking regulation; in other words, all three valves are capable of assuming arbitrary positions.

As a result of the automatic decoupling of the auxiliary pressure from the return flow line during braking, it is assured that priority is always assigned to the braking procedure in every case.

Figure 3:
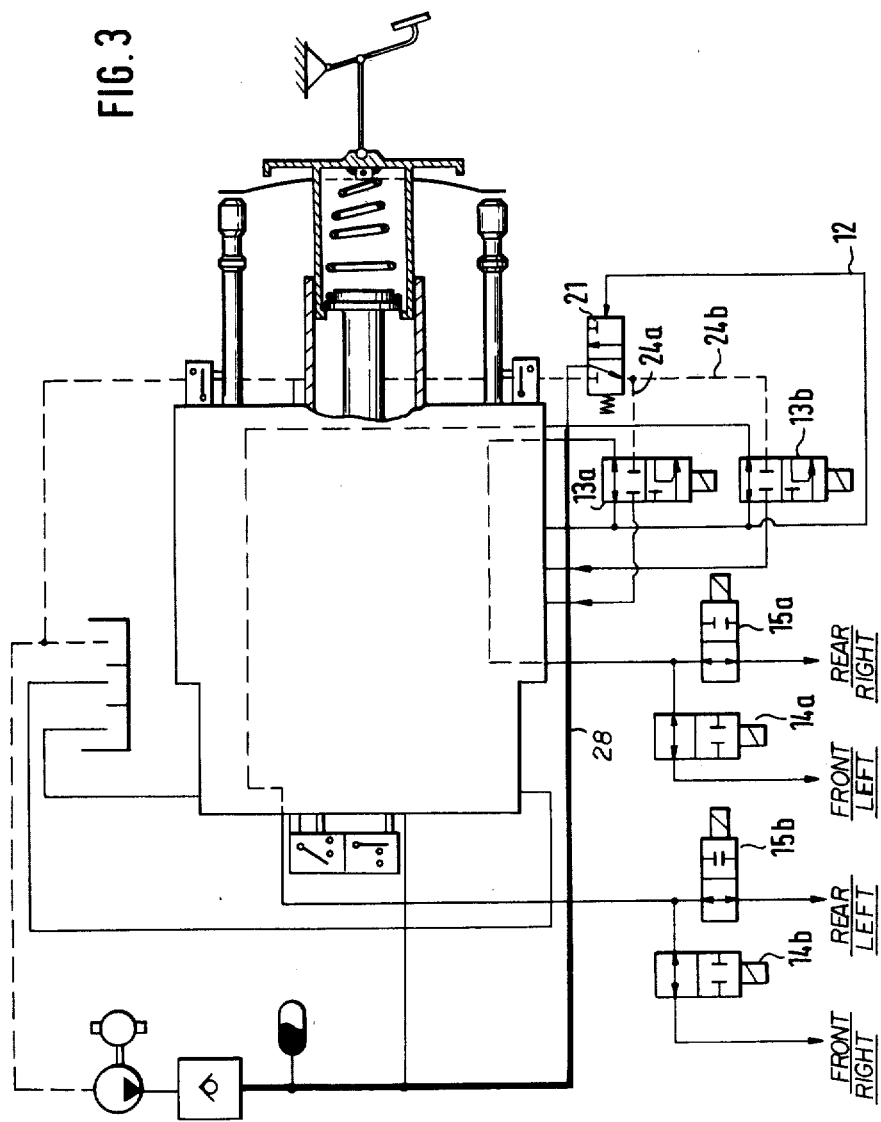
FIG. 3 is a second exemplary embodiment of the apparatus having an integrated brake force amplifier, where the systemic pressure already present in the apparatus also provides the possible pressure in the return flow line.

FIG. 3 is a schematic block diagram showing the conditions in the case of a two-circuit braking system having an integrated brake force amplifier. One two-port, two position valve 14a, b and 15a, b is assigned to each wheel, and each circuit is assigned one four-port, two position valve 13a and 13b. The systemic pressure for the system is made available in this case by a systemic pressure line 28. In connection with the present invention, it is important that this systemic pressure can be switched from the line 28 to the return flow line of the two valves 13a and 13b. This is effected in turn by means of a three-port, two position valve 21, which is actuatable by pressure medium, corresponding to the apparatus of FIG. 1.

In principle, there is agreement in the modes of operation of the propulsion control systems of FIG. 1 and FIG. 3. However, with this type of brake system, the two-circuit character must be taken into account. This is because as a rule only the front wheels or only the rear wheels are driven, yet a single circuit of the two-circuit apparatus includes one front wheel and one rear wheel.

In accordance with the table of FIG. 2, FIG. 4 shows a table plotted for the apparatus of FIG. 3, in which the relationship between the operating state and the switching state, for example, of the individual valves is shown.

Figure 5:
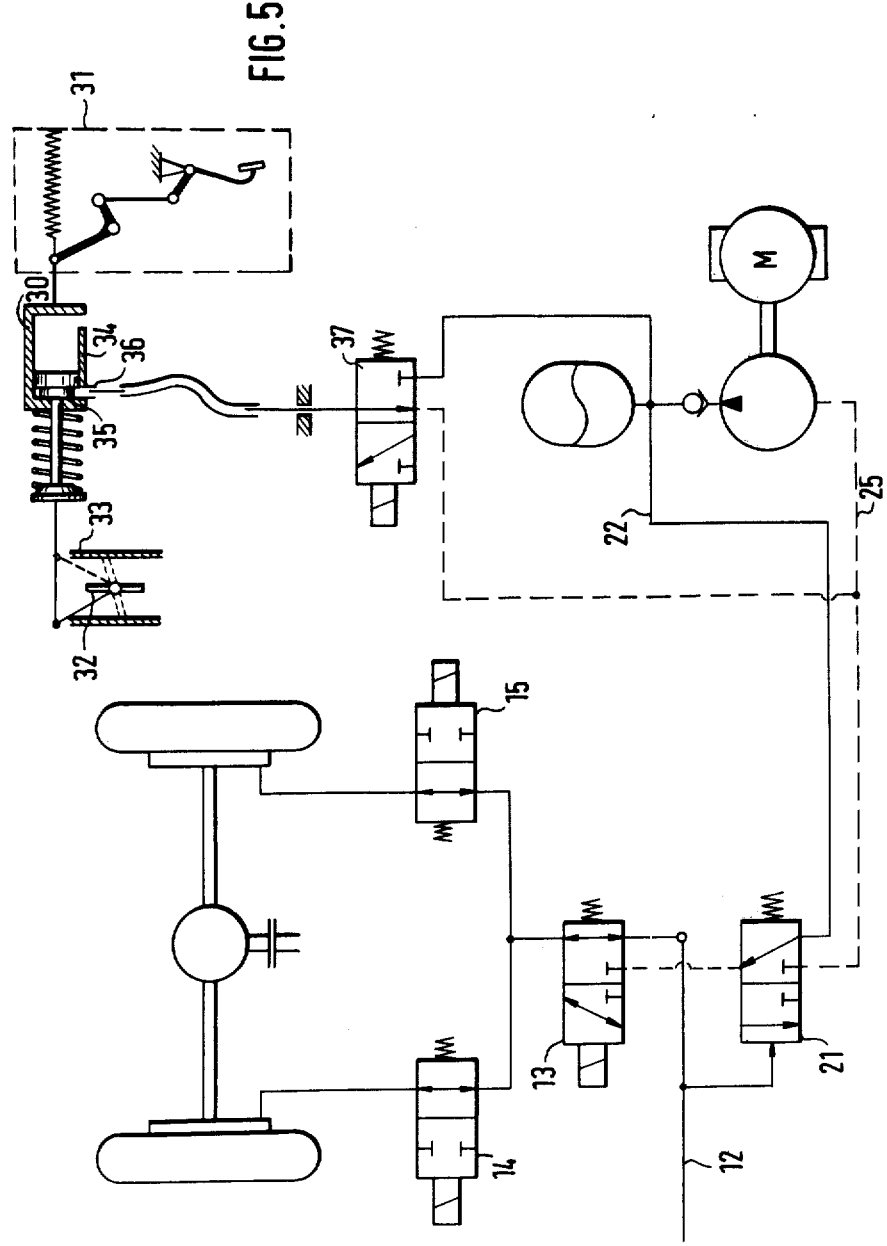
FIGS. 5 and 6 show possibilities for hydraulic intervention into the throttle valve position in accordance with the slippage of both wheels.
Figure 6:
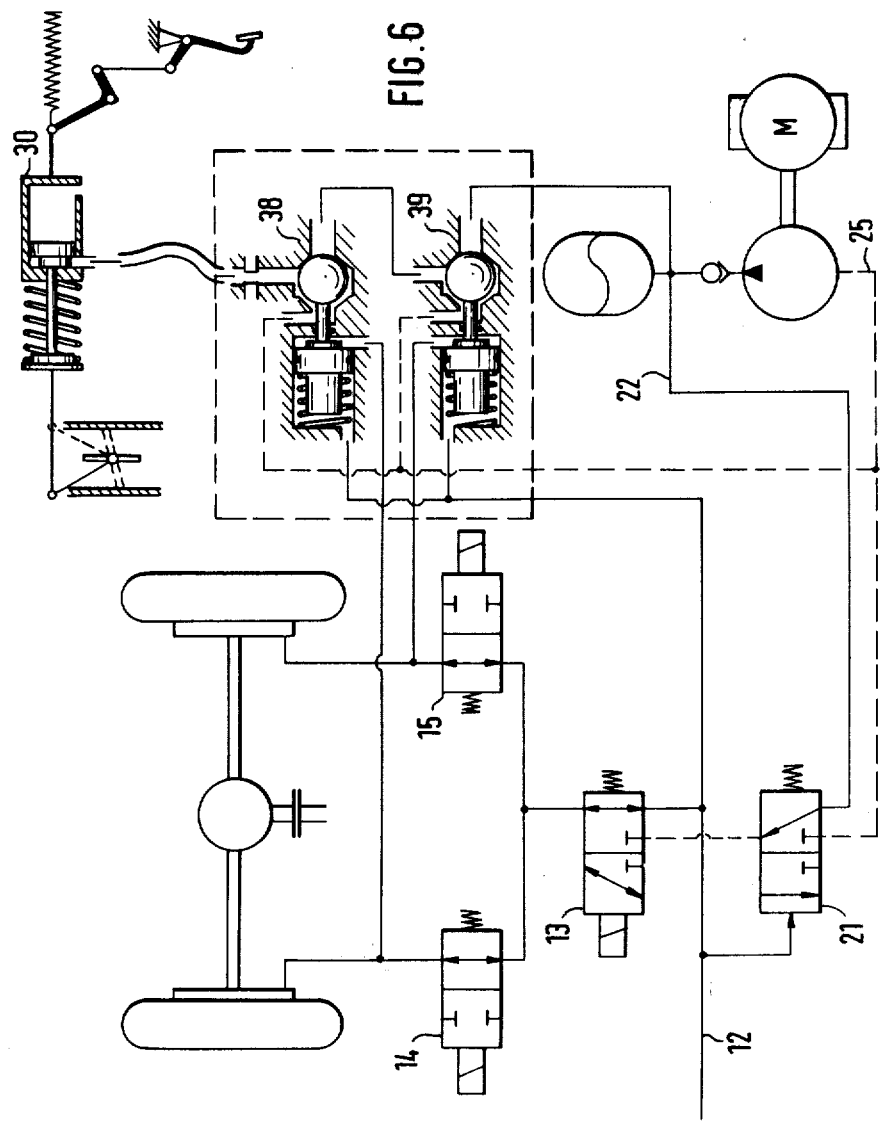

In propulsion control systems, the intended reduction in engine output in the case of the spinning of both wheels has great significance. Various proposals have become known for solving this problem, for instance the retraction of the ignition instant or a reduction in the quantity of fuel injected. It has also proved to be useful to intervene in the gas pedal linkage, in order to attain a variation of the throttle valve position in accordance with slippage. The following FIGS. 5 and 6 show two posibilities for accomplishing this. They are distinguished by great simplicity, because they substantially make use of devices with its operating medium and control signals which are already present in any case in the apparatus.

It is common to both proposals that there is a drag member 30 between a gas pedal linkage 31 and a throttle valve 32 in an air intake tube 33 of an internal combustion engine. The drag member 30 comprises a hydraulic cylinder 34 with a spring-loaded piston 35. The total length of this drag member 30 may be controlled by means of a pressure medium at a cylinder connection 36.

In the case of the subject of FIG. 5, an electromagnetically actuatable three-port, two position valve 37 serves to provide the inflow or outflow of pressure medium at the input line 36 of the drag member 30. In the resting position of the valve 37, the connection 36 is free of pressure and it couples with the outflow line 25. In the case of excessive slippage of both driven wheels, the valve 37 is excited, and the auxiliary pressure prevailing on the line 22 is switched through to the drag member 30. As a consequence of this, the total length of the drag member 30 changes and thus adjusts the relationship between the gas pedal position and the throttle valve position in such a way as to reduce the air flow throughput. This in turn causes the desired reduction in engine output.

While in the subject of FIG. 5 an electromagnetically actuatable three-port, two position valve 37 controls the supply of pressure medium to the drag member 30, FIG. 6 shows a pressure medium control system for the drag member which operates purely hydraulically. This system comprises a hydraulically realized AND member and provides for a supply of pressure into the drag member 30 whenever the slippage at both wheels exceeds certain values and these wheels are accordingly braked by means of the auxiliary pressure on line 22. The hydraulically realized AND member comprises two hydraulically controlled three-port, two position valves 38 and 39 disposed one behind the other, which receive their switching signals from the points connecting the valves 14 and 15 with the respective wheel brake cylinders. The respective return line of the valves 38 and 39 is connected with the outflow line 25. In order to assure that there is no influence exerted on the drag member 30 during the braking process, the control portion of valves 38 and 39 is coupled with the main cylinder line 12. In the case of undesirably high slippage and thus a control of the drag member 30, the main cylinder line 12 serves as a return flow line for the switching medium of the valves 38 and 39; in the case of the braking procedure, these valves 38 and 39 are fixed in their resting position instead.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A brake apparatus for a motor vehicle having anti-skid regulation and regulation of the start-up slippage, including a brake pressure generator for supplying a pressure medium in a main line, a pressure source containing a pump, valve means actuatable by a control circuit in accordance with wheel movement behavior for blocking the supply of said pressure medium and for diverting said pressure medium into a return-flow line, a further valve for connecting said pressure source to wheel brakes of said motor vehicle, said control circuit actuating said valve means for the purpose of pressure regulation, said further valve being incorporated into said return-flow line for the purpose of feeding the pressure of said pressure source into said return-flow line and via said valve means into a wheel brake cylinder of a wheel exhibiting a start-up slippage.

2. An apparatus according to claim 1, wherein said further valve is responsive to the actuation of a brake pedal of said motor vehicle.

3. An apparatus according to claim 2, wherein said further valve is a two-port, two-position valve actuated by said pressure medium.

4. An apparatus according to claim 3, wherein control of said further valve is coupled with said main line.

5. An apparatus according to claim 4 wherein at least one electromagnetic actuatable three-port, two-position valve is located in said main line for switching, in a resting state, the pressure in said main line through to individual wheel brake cylinders of said motor vehicle, and in an excited state, the wheel brake cylinders to said return flow line.

6. An apparatus according to claim 4, wherein the pressure in the return flow line is furnished selectively by a separate pressure generating means.

7. An apparatus according to claim 4, wherein a means responsive to a means for indicating an excessive slippage of all the driven wheels of said motor vehicle reduces the engine output.

8. An apparatus according to claim 1, wherein a means responsive to a means indicating an excessive slippage of some of the driven wheels of said motor vehicle reduces engine output.

9. An apparatus according to claim 8, wherein a varied throttle valve position of said responsive means effectively produces reduction of the engine output in response to excessive slippage.

10. An apparatus according to claim 9, wherein a controllable drag member having a pressure control line is disposed between a gas pedal means and said responsive means.

11. An apparatus of claim 10, wherein control of said drag member is effected by means of an auxiliary pressure on said return flow line.

12. An apparatus of claim 11, wherein an electromagnetically actuatable three-port, two-position valve is located in said pressure control line for the drag member.

13. An apparatus of claim 11, wherein a hydraulic AND-member is located in pressure control line for the drag member.

14. An apparatus of claim 13, wherein the hydraulic AND-member comprises the three-port, two position valves which are selectively switchable in accordance with pressure in the wheel brake cylinder lines.

* * * * *